(No Model.)

F. JENSSEN.
SEPARATION OF NITRIC ACID FROM A MIXTURE OF NITRIC AND SULPHURIC ACIDS.

No. 284,742. Patented Sept. 11, 1883.

Witnesses,
Geo. H. Strong.
J. H. Rouse.

Inventor,
Fred Jenssen
By Dewey & Co.
Attorneys

UNITED STATES PATENT OFFICE.

FRED. JENSSEN, OF SAN FRANCISCO, CALIFORNIA.

SEPARATION OF NITRIC ACID FROM A MIXTURE OF NITRIC AND SULPHURIC ACIDS.

SPECIFICATION forming part of Letters Patent No. 284,742, dated September 11, 1883.

Application filed February 27, 1883. (No model.)

*To all whom it may concern:*

Be it known that I, FRED. JENSSEN, of the city and county of San Francisco, State of California, have invented an Improvement in Separating Nitric Acid from Mixtures of Nitric and Sulphuric Acids; and I hereby declare the following to be a full, clear, and exact description thereof.

My invention relates to a new and useful process of separating from a mixture of nitric and sulphuric acids the nitric acid in separate portions or quantities according to their several strengths and by a continuous operation; and it consists in passing a continuous stream of the mixture through a connected series of retorts, to which are given separate degrees of heat, and in distilling the nitric acid over from each retort into separate receivers. In this operation the strongest nitric acid requiring the least degree of heat will distill over from the first of the retorts, and the weakest from the last where the greatest heat is required, so that in each of the receivers there will be a different strength of the acid.

The object of my invention is to separate the nitric acid from the mixture of nitric acid and sulphuric acids for whatever use may be desirable. The reason for this mixture in the first place may be either to concentrate the nitric acid by subsequent distillation, or it may be acquired in the progress of many operations, unnecessary to mention here. The apparatus which I use to accomplish this result consists, simply, in a number of vessels or retorts of any desired and suitable shape or material, so arranged and connected each with an entrance and exit that a liquid may be supplied to the first, whence it shall pass through each and find an escape from the last. With each of the retorts is connected its receiver or condenser, also of any suitable material or pattern, and with the last is connected a suitable cooler, all of which may be seen by reference to the accompanying drawings, in which—

Figure 1:
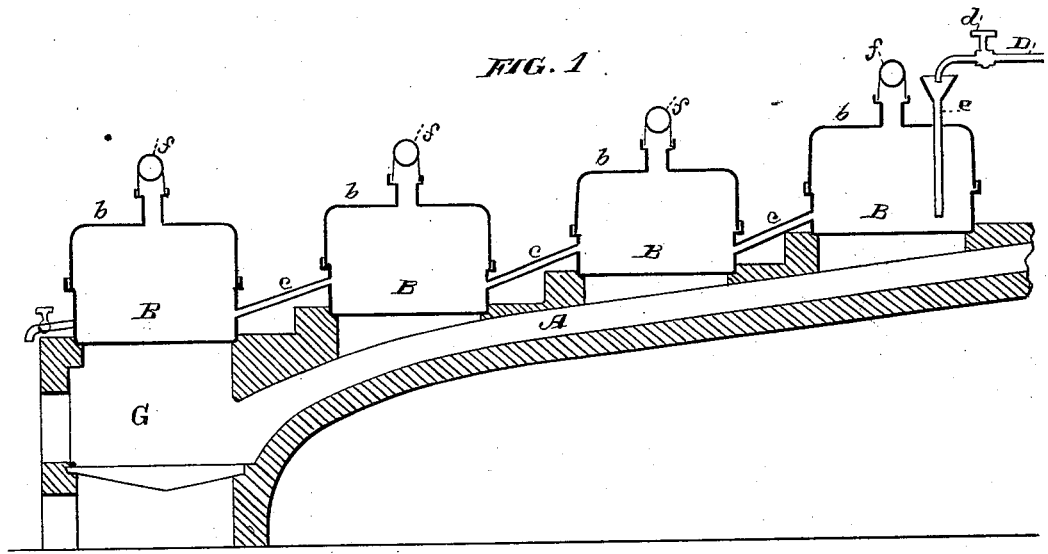
Figure 2:
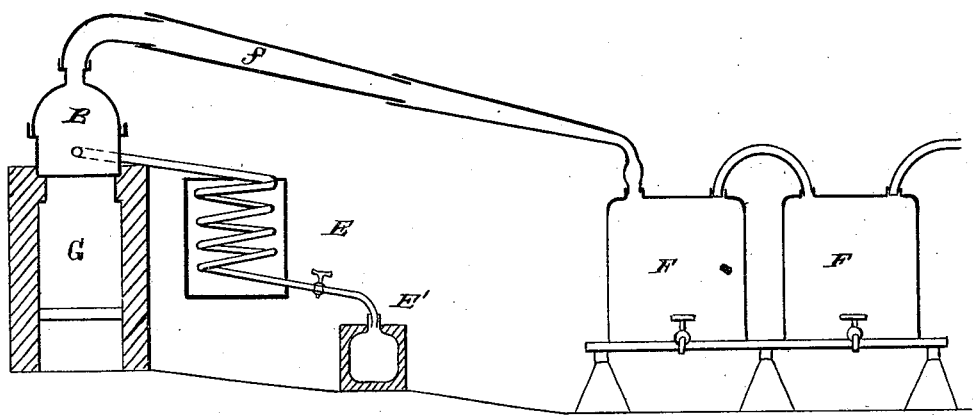

Figure 1 is a longitudinal section. Fig. 2 is a cross-section of apparatus, showing cooler E.

Let A represent a furnace-flue constructed with a series of levels, as shown, upon which are placed the vessels or retorts B, (here shown as four in number, though there may be as many as may be found necessary for the complete separation of the acid.) These vessels are each provided with caps $b$, and are connected with each other by pipes or tubes $c$, the exit in each being lower than the entrance, in order that there may be a flow of the liquid.

D represents the supply-pipe, governed by a cock or valve, $d$. This pipe is adapted to discharge the liquid coming from the source of supply into the highest or first of the retorts through a tube, $e$.

E represents any suitable form of cooler, connected with the lowest or last of the retorts, as shown, and E′ is a carboy connected with the cooler. By this arrangement it will be seen that a liquid supplied to the first of the retorts will pass through all into the cooler E, and, if drawn off by emptying the carboy at suitable times, the supply being maintained, the flow will be continuous.

F represents a suitable form of receiver or condenser. There are to be four of these, each connected with a retort by a tube, $f$.

G is the fire-box of the furnace under the lowest of the retorts.

These parts constitute an apparatus by means of which my process is carried into operation.

Given the mixture of nitric and sulphuric acids, whether mixed expressly for the present process or acquired in this condition, the object is to separate the nitric acid from the sulphuric acid in separate portions or quantities, according to the degree of strength, the operation to be continuous. The mixture is first placed in considerable quantity in a suitable reservoir, from which it may be drawn by the pipe D. It flows first into the highest retort, and there being subjected to but little heat, only the very strongest of the nitric acid will distill or pass over into the receiver connected with said retort. The supply being continuous, the mixture will pass down into the next retort, though somewhat weakened; but being subjected to a slightly-increased heat, a weaker nitric acid will pass over into the receiver connected with the second retort. In like manner a still weaker acid will distill over from the third retort, and so on until the last retort, where there is but little nitric acid remaining; but here a high degree of heat being directed upon it, all that is left will pass over as the weakest nitric acid, leaving nothing but the pure sulphuric acid, which passes off into the cooler and is drawn off in order to make the operation continuous. Thus I obtain the several strengths of the nitric acid in separate vessels, and may use them as the necessities of the case require.

It is obvious that I need not carry this process to the end as I have described, for I may find it necessary to leave a portion of the nitric acid with the sulphuric acid for any purpose desirable. I could do this by drawing off from a higher retort, or by applying less heat to the last retort.

I am aware that it is not new to recover acids from the residuum remaining after the manufacture of nitro-glycerine by dropping the dilute residuum in small quantities through heated chambers filled with obstruction, passing sulphurous-acid gas into the same, and collecting the resultant nitric acid, and I do not claim such as my invention.

Having thus described my invention, what I claim as new, and desire to secure by Letters Patent, is—

The process of separating from a mixture of nitric and sulphuric acids the nitric acid in separate portions or quantities of different strengths and by a continuous operation, consisting in passing a continuous stream of the mixture through a connected series of retorts, to which are given separate degrees of heat, and in distilling the nitric acid over from each retort into separate receivers, substantially as herein described.

In witness whereof I hereunto set my hand.

FRED. JENSSEN.

Witnesses:
G. W. EMERSON,
J. H. BLOOD.